US011518321B2

(12) United States Patent
Oko

(10) Patent No.: US 11,518,321 B2
(45) Date of Patent: Dec. 6, 2022

(54) VEHICLE PROTECTION DEVICE

(71) Applicant: Arinzechukwu Winston Oko, Austin, TX (US)

(72) Inventor: Arinzechukwu Winston Oko, Austin, TX (US)

( * ) Notice: Subject to any disclaimer, the term of this patent is extended or adjusted under 35 U.S.C. 154(b) by 179 days.

(21) Appl. No.: 16/998,336

(22) Filed: Aug. 20, 2020

(65) Prior Publication Data

US 2021/0053509 A1 Feb. 25, 2021

Related U.S. Application Data

(60) Provisional application No. 62/890,949, filed on Aug. 23, 2019.

(51) Int. Cl.
*B60R 13/04* (2006.01)

(52) U.S. Cl.
CPC .................................. *B60R 13/043* (2013.01)

(58) Field of Classification Search
CPC .................................................. B60R 13/043
USPC .......................................................... 293/128
See application file for complete search history.

(56) References Cited

U.S. PATENT DOCUMENTS

| | | | | |
|---|---|---|---|---|
| 4,002,363 A | * | 1/1977 | James | B60R 13/04 293/128 |
| 5,184,857 A | * | 2/1993 | Hawkins | B60R 13/04 293/128 |
| 5,333,923 A | * | 8/1994 | Whitfield | B60R 13/04 293/21 |
| 6,247,734 B1 | * | 6/2001 | Hamilton | B60R 13/04 293/128 |
| 6,736,435 B1 | | 5/2004 | Ditthavong | |
| 2013/0147173 A1 | * | 6/2013 | Wohlberg | B60J 11/06 280/770 |

FOREIGN PATENT DOCUMENTS

WO   WO-2013090368 A1 *  6/2013  .............. B60J 11/00

OTHER PUBLICATIONS

Auto Dent Specialists, The Most Common Sources of Auto Dents and How to Prevent Them, Dec. 26, 2016.
(Continued)

*Primary Examiner* — Pinel E Romain
(74) *Attorney, Agent, or Firm* — Craige Thompson; Thompson Patent Law; Timothy D. Snowden

(57) ABSTRACT

Apparatus and associated methods relate to a vehicle protection device (VPD) having a telescoping barrier including a housing with at least one telescoping extension extending therefrom, and having clips at each end of the telescoping barrier to attach the VPD to a vehicle. In an illustrative embodiment, a security extension attached to the housing which may releasably couple the VPD to a vehicle. Clips provided with two arms which may be operated to releasably couple the clip to a vehicle tire and wheel rim. A VPD provided with rotating extension arms. A VPD provided with at least one mechanism operable to transition the VPD between a fully collapsed state and a fully extended state, or partially therebetween. A VPD provided with fender clamps. Various embodiments may advantageously provide a compact, removable, retractable, non-magnetic vehicle scratch, ding, and dent protector.

20 Claims, 8 Drawing Sheets

(56) References Cited

OTHER PUBLICATIONS

BMW 3-Series and 4-Series Forum, Door dings—what do you do to prevent them?, Blog Post, Jul. 5, 2010.
Dent Wise Removal, Dent Repair (PDR) is Important to Ensure Resale Value, Aug. 24, 2018.
dentzilla.net, Door Dings? How to Avoid Parking Lot Car Scratches, Mar. 3, 2018.
"Unfortunately, dents and dings are impossible to prevent . . . ".
Mazdas 247 the 24/7 Mazda Community, how to prevent dings and dent 101, Blog post, Jun. 12, 2008.
Mercedes-Benz USA, What to you do to keep your car from getting scratches and dings?, blog posting.
MSU Red Cedar Message Board, Jan. 20, 2014.
Network Auto Body Inc., Tired of those Unsightly Dings on your Car?, Jan. 14, 2016.
Practical Frugal Living, Six Simple Strategies for Protecting your Vehicle form Dents and Dings, Sep. 16, 2012.
TMC, Best method to protect against the inevitable door dings and other careless people, Blog Post, Jan. 1, 2014.
Whirlpool Forums Automotive, How to avoid dings/scratches in car park, Blog Post, Jan. 2, 2011.

* cited by examiner

VEHICLE PROTECTION DEVICE

CROSS-REFERENCE TO RELATED APPLICATIONS

This application claims the benefit of U.S. Provisional Application Ser. No. 62/890,949, titled "VEHICLE PROTECTION DEVICE," filed by Arinzechukwu Winston Oko, on Aug. 23, 2019.

This application incorporates the entire contents of the foregoing application(s) herein by reference.

TECHNICAL FIELD

Various embodiments relate generally to a vehicle protection device.

BACKGROUND

For most consumers, an automobile is a substantial financial investment. Thus, motorists may aim to care for their auto mobiles to preserve the automobiles appearance as well as operation. Dings and dents are a common occurrence, which may arise from the carelessness of other motorists when opening the doors of their cars. These careless acts may be innocent; however, the resulting damage or abrasions to the sides of an automobile may result in significant repair costs. Motorists, may seek to avoid dings and dents by parking far away from other cars to minimize the possibility of having their vehicle damaged. Because of the expense in terms of actual cost and time, many automobile owners may leave dings and dents unrepaired, despite being disheartened by the marred appearance of the vehicle.

SUMMARY

Apparatus and associated methods relate to a vehicle protection device (VPD) having a telescoping barrier including a housing with at least one telescoping extension extending therefrom, and having clips at each end of the telescoping barrier to attach the VPD to a vehicle. In an illustrative embodiment, a security extension may be attached to the housing which may releasably couple the VPD to a vehicle. Clips may be provided with two arms which may be operated to releasably couple the clip to a vehicle tire and wheel rim. A VPD may be provided with rotating extension arms. A VPD may be provided with at least one mechanism operable to transition the VPD between a fully collapsed state and a fully extended state, or partially therebetween. A VPD may be provided with fender clamps. Various embodiments may advantageously provide a compact, removable, retractable, non-magnetic vehicle scratch, ding, and dent protector.

Exemplary embodiments may provide various advantages. In an illustrative embodiment, a VPD may be configured to protect a vehicle from impacts that may occur from other drivers slamming their door, shopping carts, or other object, colliding with the protected vehicle. In an illustrative embodiment, a VPD may be configured to prevent minor side swipes that may occur from a vehicle turning into a parking spot. In an illustrative embodiment, a center housing may be adjusted longitudinally along a VPD in an extended or partially extended state. In an illustrative embodiment, a VPD may be attached to a vehicle using, for example, an adjustable and foldable tire and wheel clips or clamps, or adjustable fender clamps. In some embodiments, a VPD may be provided with fold-out extensions on each end of the device, which may advantageously provide additional coverage to extremities of the vehicle. A VPD may be provided with a securing extension and terminus to advantageously releasably secure the VPD to a vehicle. In various embodiments, a VPD may be provided with rubberized linings, rubber impact rings, rear impact rubber bumpers, spacers, or some combination thereof.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
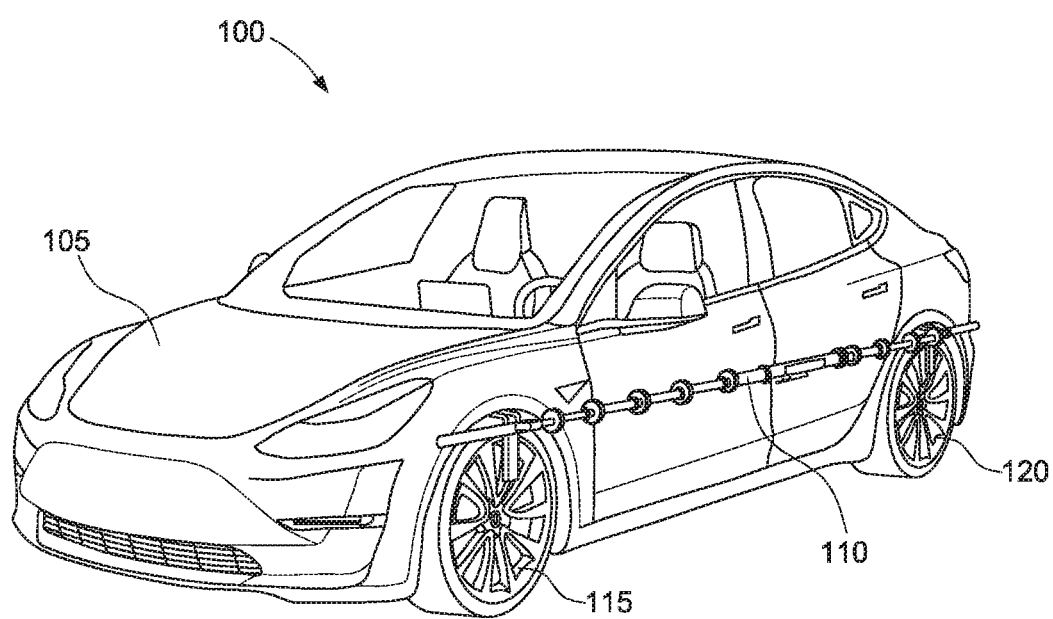
FIG. 1 depicts an exemplary vehicle protection device in an illustrative use case.

FIG. 1 depicts an exemplary vehicle protection device in an illustrative use case 100. Vehicle protection device (VPD) 110 is mounted along one side of a vehicle 105 by securing the VPD 110 to the front wheel 115 and back wheel 120. In some embodiments, a vehicle protection device (VPD) may be used for protection against vehicle scrapes, scratches, dings, dents or similar. The VPD may attach, for example, to the tires, wheels, wheel spokes, wheel wells, fenders, quarter panels or similar portions a vehicle. In some embodiments, a VPD may attach using an adjustable clip, clamp or similar mechanism. In some embodiments, a VPD may include a retractable or telescopic mechanism that is extended and retracted for protection of the object or vehicle. In some embodiments, a VPD may include foldable extensions on each end for added length and protection. A VPD may be used, for example, along one or both sides of a vehicle, across a front of a vehicle, across a back of a vehicle, along or across some portion of the side, front, or back of a vehicle, or some combination thereof.

Figure 2A:
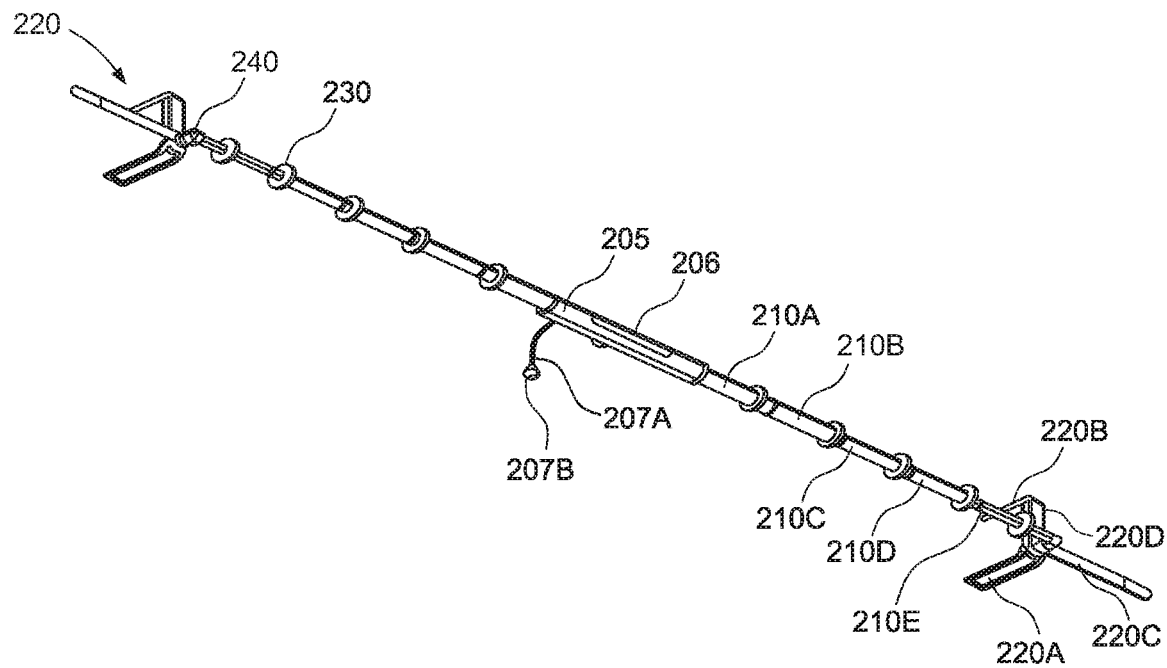
FIG. 2A depicts an exemplary vehicle protection device in an extended state.
Figure 2B:
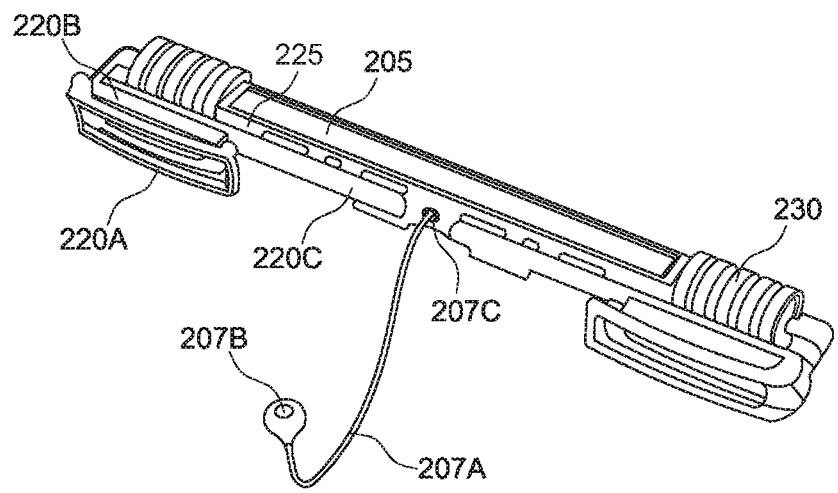
FIG. 2B depicts the exemplary vehicle protection device of FIG. 2A in a collapsed state.

FIG. 2A depicts an exemplary vehicle protection device in an extended state. FIG. 2B depicts the exemplary vehicle protection device of FIG. 2A in a collapsed state. In an extended state, shown in FIG. 2A, telescoping extensions 210A, 210B, 210C, 210D, and 210E extend one from another, and all extend from a central housing 205 (also referred to as body 205). In a collapsed state, shown in FIG. 2B, 210E nests inside 210D, which nests inside 210C, which nests inside 210B, which nests inside 210A, which nests inside the central housing 205. A release button 206 may be operated to transition the VPD between the collapsed state and the extended state. The VPD is a temporary protection device which may be attached to or detached from the vehicle. It can be retracted and stowed away when not in use, but when in use may be partially or fully extended to fit the respective vehicle it is being attached to.

Clips 220 are provided at the end of each final telescoping section. Each clip 220 is connected to a spacing coupler 240, which is connected to a final telescoping extension 210E. The spacing coupler may be rotatably connected to the telescoping extension, to the clip, or both. The clips may be configured, for example, to clip to a wheel, tire, fender, body panel, or some combination thereof. Clip body 220D may swivel, for example, from being oriented parallel to a body 205 (as in FIG. 2B), to approximately orthogonal thereto (as in FIG. 2A). In an extended state, first arms 220A and second arms 220B fold out, from a collapsed state, from clip bodies 220D. Similarly, extension arms 220C swivel out from lying along the body 205, between the body 205 and the clip body 220D, to extending outward parallel to the body 205. Accordingly, the device may, for example, be quickly and easily installed along substantially the entire side of a vehicle (or some portion thereof) and may, therefore, advantageously protect the vehicle from dents, scrapes, scuffs, dings, scratches, minor side-swipes, and similar damage from pedestrians, vehicles, shopping carts, scooters, and other moving objects.

The VPD may be secured to a vehicle to prevent accidental or unauthorized removal via security cord 207A and security catch 207B. For example, security cord 207A may be substantially stowed in a body of the VPD, through aperture 207C. The security catch 207B may then, for example, be shut into a vehicle door. A latch or button (not shown) may be operated to retract any additional length of cord 207A back into housing 205 through aperture 207C. The cable may be, for example, a cut resistant security cable and security ball, configured such that the ball may be closed inside the door of a vehicle, or otherwise locked, wedged, or secured inside or onto the vehicle, to prevent unintended or unauthorized removal. The VPD may include a handle pull and hook or recoil tensioner or similar mechanism to secure the cable and ball.

Separators 230 are positioned at each telescoping junction, such that, when the telescoping extensions are collapsed, they rest next to each other, as shown in FIG. 2B. When extended, because a separator 230 is positioned at each junction, the separators are spaced apart and may provide multiple points of protection for the vehicle. In some embodiments the separators may be, for example, impact absorbing rings, bumpers or cushions across the device. The separators may be at least partially constructed from plastic, rubber, urethanes, foam, silicone, or other materials which may be resilient, flexible, compliant, elastic, or some combination thereof. The separators may be configured to advantageously absorb impact shock. The separators may serve as cushions for impacts, and so may protect the attached vehicle from direct impact. The separators may also serve to protect the adjacent vehicle or object from damage. In some embodiments, the separators may be positioned as desired by a user by collapsing or partially collapsing selected telescoping sections. Similarly, the housing 205 may be, for example, positioned off-center along the extended VPD by selectively collapsing or partially collapsing selected sections. In some embodiments, the separators may not be fixed to a telescoping section junction, and may be adjusted to specific locations where the user feels that dings or dents are most likely to occur, or may be spread out. A surface of housing 205 which may typically face the body of the vehicle, is provided with lining 225. The lining 225 may, for example, be rubber, urethane, silicone, neoprene, foam, or other appropriate shock absorbing material. Lining 225 may protect the body of the vehicle from damage when the housing 205 comes into contact therewith.

A VPD may be releasably coupled to a vehicle, for example, by securing a first and second clip 220 over a front and back wheel of a vehicle, respectively, such that the housing 205 and telescoping extensions 210A-210E extend along the side of the vehicle Extension arms 220C may extend beyond the wheels to front and rear body panels. The tire and wheel clips or similar mechanism may be adjustable. The clips 220 may attach to a wheel, tire, or both of a vehicle by the second arm 220B inserting between spokes or an opening in the wheel, and the first arm 220A that goes on top of the tire. In some embodiments, the clips may include or be replaced with adjustable clamps.

When the clips 220 are attached, the first arms 220A and second arms 220B may be compressed to firmly grip the tires and wheels while simultaneously being locked into position. A spring mechanism may be built into to the arms of each clip to firmly and securely hold it in place. The clips may rotate in multiple predetermined orientations, or may rotate freely within a range of freedom, to allow for more adjustability and enable the installer to find an advantageous fitting angle for attachment. To detach from the vehicle, the user may pull the lower arm 220B of the clip slightly down and remove the clip 220 from the tire and wheel. Once detached, the first 220A and second arm 220B of the clip 220 may fold into each other along clip body 220D, with the lower arm 220B folding in between the upper arm 220A. The clip 220 may be rotated to be oriented parallel with the body 205.

Figure 3:
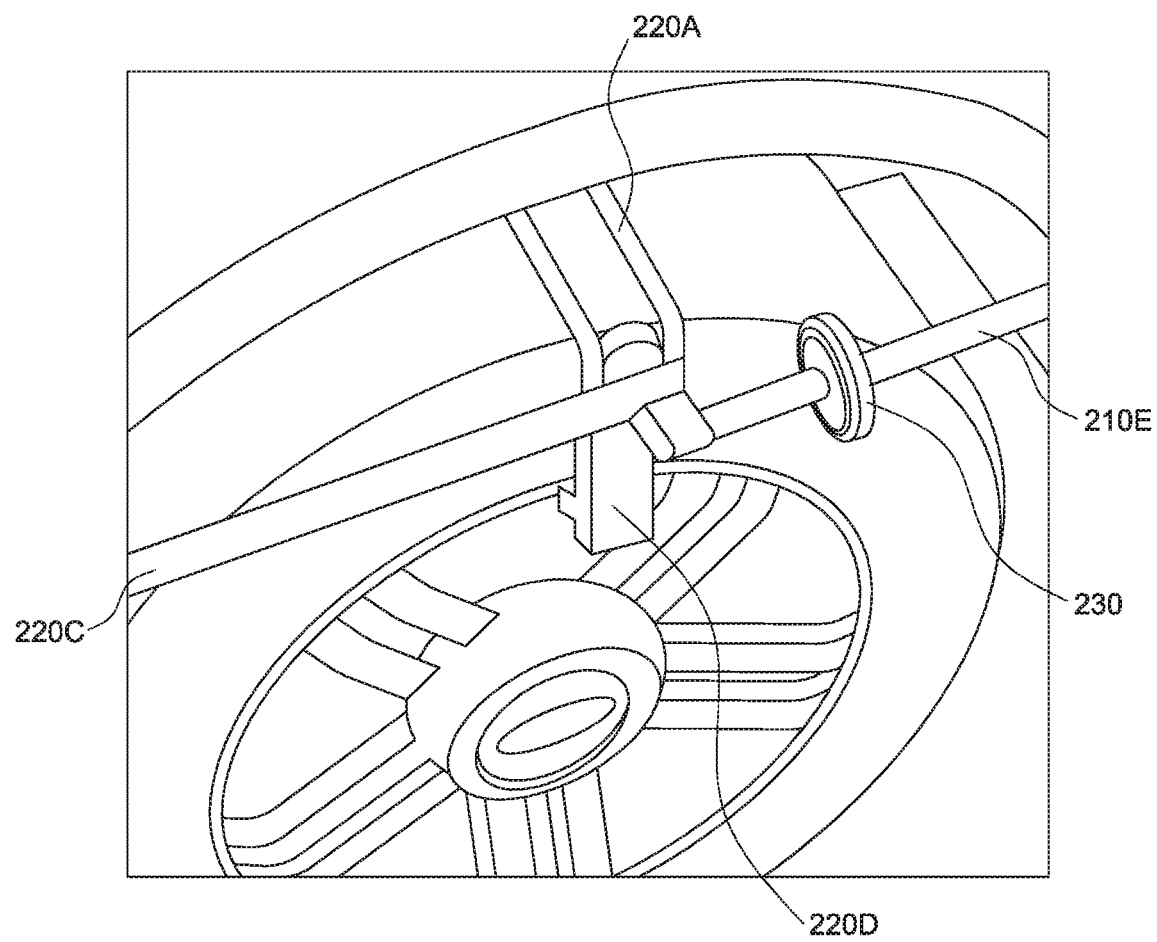
FIG. 3 depicts an exemplary clip implemented in a vehicle protection device in an illustrative use case.

FIG. 3 depicts an exemplary clip implemented in a vehicle protection device in an illustrative use case. Telescoping section 210E is provided with separator 230. The clip 220 is swiveled downwards, approximately perpendicular to the telescoping section 210E, and deployed. The second arm 220B (not shown) may be slipped through an aperture in the rim 305. First arm 220A is gripping the tire 310. First arm 220A and second arm 220B may be spring-loaded in opposite directions, thereby being advantageously urged together and, thereby, gripping the tire and wheel therebetween. A rubber or similar material tire may advantageously increase grip strength, by providing enhanced friction between the tire 310 and the first arm 220A. Extension arm 220C is swiveled outwards to be substantially parallel to the telescoping section 210E, and extending from clip body 220D, thereby extending at least partially over a body panel to the left of the wheel from the telescoping section and, thereby, may advantageously provide protection thereto. The extension arm may be located, as depicted, in between the clip body 220D and the telescopic pole extension 210E (and by extension the body 205, when the VPD is in a collapsed state). In some embodiments, an extension arm may be provided in another location, such as attached to a telescoping arm, a housing, etc. In some embodiments, additional extension arms may be provided in various locations.

Figure 4A:
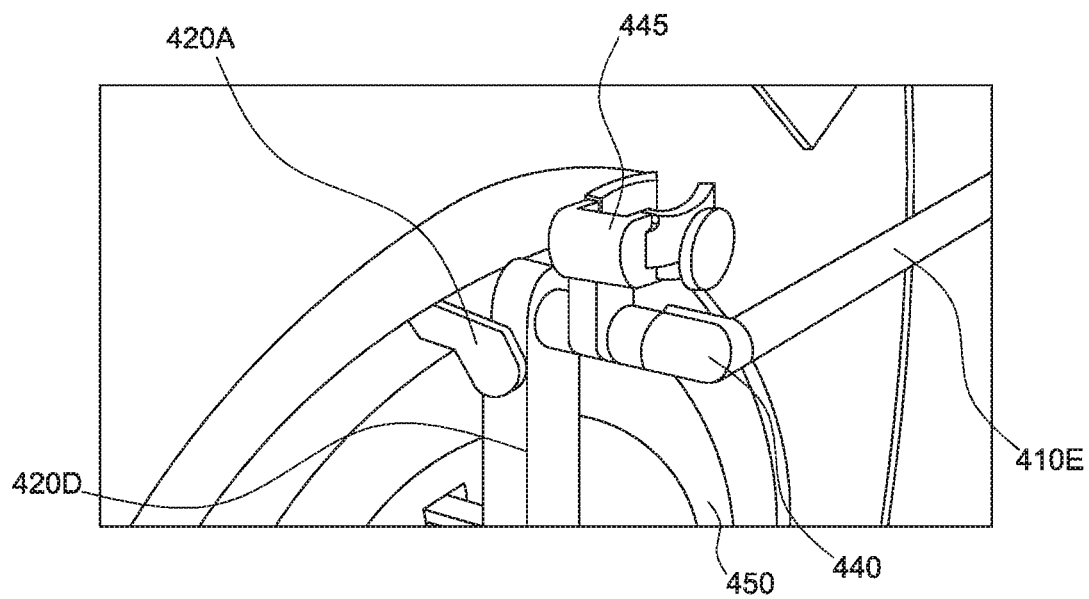
FIG. 4A depicts an exemplary fender clamp implemented in a vehicle protection device in an illustrative use case.
Figure 4B:
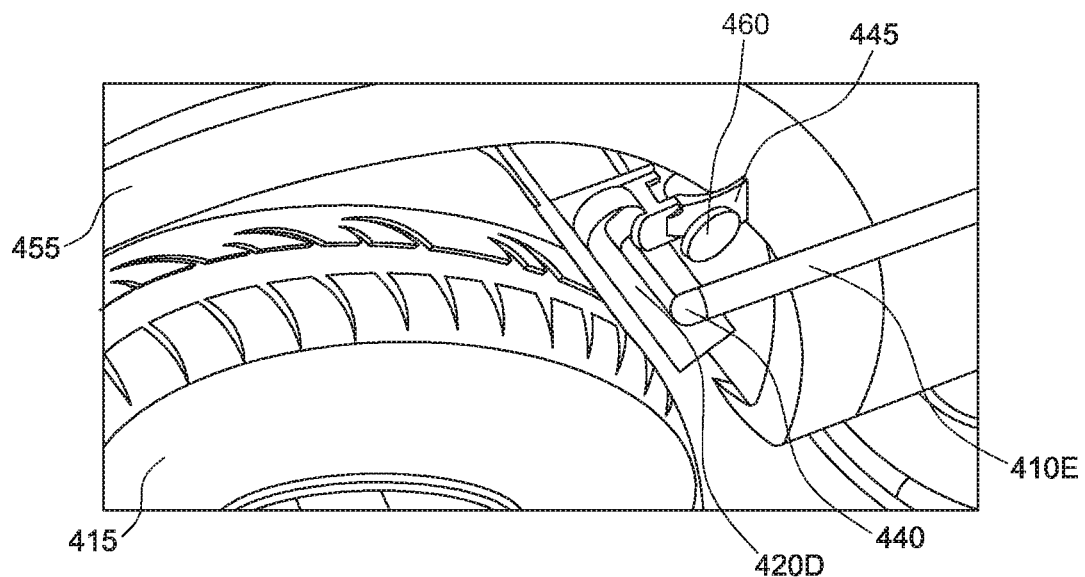
FIG. 4B depicts the exemplary fender clamp of FIG. 4A implemented in a vehicle protection device in a second illustrative use case.

FIG. 4A depicts an exemplary fender clamp implemented in a vehicle protection device in an illustrative use case. FIG. 4B depicts the exemplary fender clamp of FIG. 4A implemented in a vehicle protection device in a second illustrative use case. The VPD may be similar, for example, to that described in relation to FIG. 3. At an end of telescoping section 410E is rotatably connected a coupler 440. Coupler 440 is rotatably connected to fender clamp 445. A clip is rotatably connected to at least one of the coupler 440 and fender clamp 445. The clip is provided with first arm 420A. The first arm 420A of the clip is clipped over tire 450. A second arm (not shown) may be inserted through an aperture in the wheel on which tire 450 is mounted, and cooperate with first arm 420A to clamp the clip in place.

The exemplary use case in FIG. 4B depicts the fender clamp in use to clamp the VPD in place. The telescoping section 410E is rotatably connected to coupler 440. The clip arms (not shown) may be folded against clip body 420D, which is in rotatable connection with coupler 440, fender arm 445, or both. The clip body 420D may be arranged, as depicted, to not touch tire 415. The fender clamp 445 is provided with two clamping members that may be urged together by operation of clamping knob 460 to releasably grip fender 455. The clamping members may be, for example, of a semi-rigid material, or of a rigid material with a flexible coating. The fender clamp may be operated, for example, using a captive screw, a push release lever, or scissor clip. The fender clamp may be detached, for example, by the user loosening a captive screw or pushing a release lever.

The fender clamp may, for example, adjust distally and proximally in relation to the coupler 440, rotate about the portion of coupler 440 perpendicular to the telescoping sections, rotate relative to an axis orthogonal to both coupler 440 and to the telescoping sections, or some combination thereof. Accordingly, the VPD may be releasably attached to the vehicle using the fender clamps in one or more locations, rotated and adjusted according to a desired position of the VPD and the geometry of the vehicle and fenders. In some embodiments, the fender clamps may be used in combination with the clips. Fender clamps may be advantageously used, for example, on vehicles lacking a suitable opening in the wheels, or having overly large or overly small tire side profiles that do not fit within the range of first and second arms of a clip.

Figure 5A:
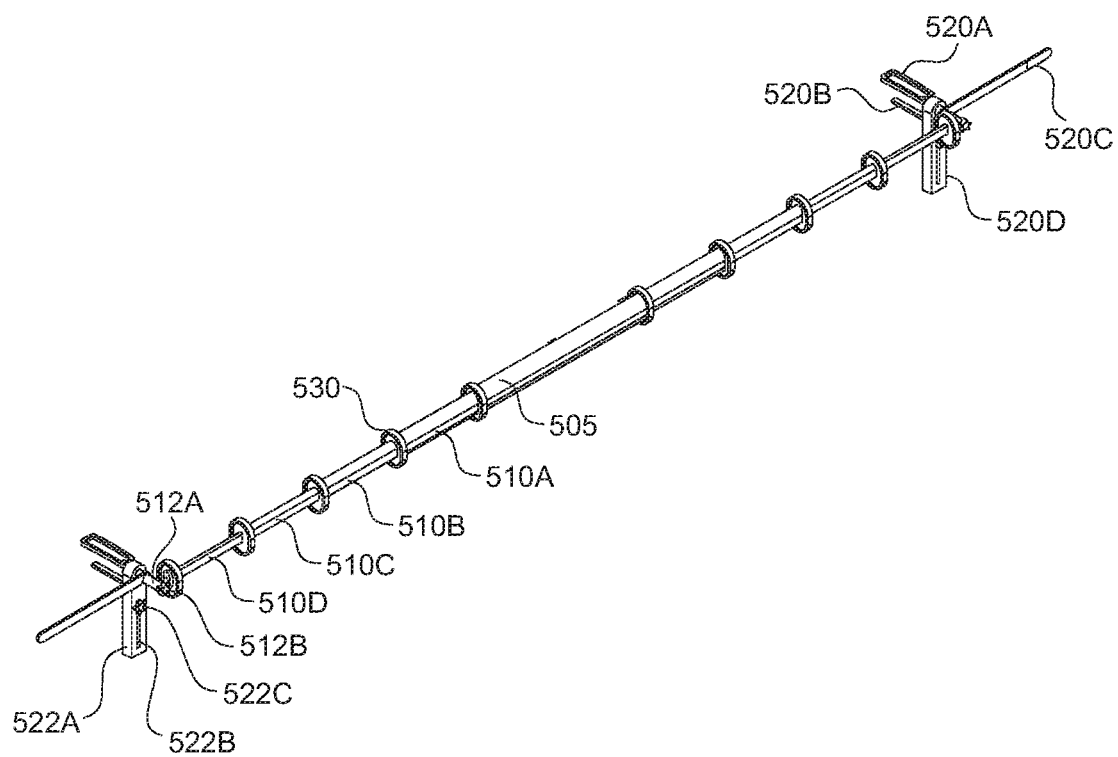
FIG. 5A depicts an exemplary vehicle protection device in an extended state.
Figure 5B:
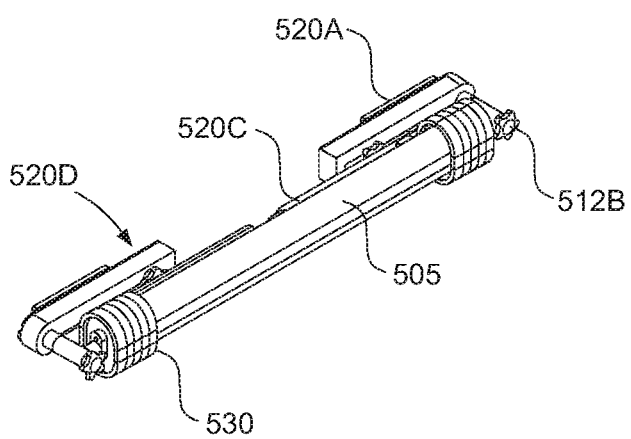
FIG. 5B depicts the exemplary vehicle protection device of FIG. 5A in a collapsed state.

FIG. 5A depicts an exemplary vehicle protection device in an extended state. FIG. 5B depicts the exemplary vehicle protection device of FIG. 5A in a collapsed state. In a collapsed state (shown in FIG. 5B), multiple telescoping extensions are disposed one within another into housing 505. When transitioned to an extended state, depicted in FIG. 5A, both telescoping sections 510D extend from respective telescoping extensions 510C, which extend from respective telescoping sections 510B, which extend from respective telescoping sections 510A, which extend from housing 505. Separators 530 are provided at each joint between telescoping extensions such that they are spaced apart when the telescoping extensions are extended.

Couplers 512A are connected to the respective ends of final telescoping extensions 510D. Each coupler 512A is provided with a knob 512B that may be operated to loosen a clamped connection of the telescoping extension 510D, the extension arm 510C, and the coupler 512A. Clips 520D are provided with first arm 520A and second arm 520B. Clip 520D is provided with a body 522A, and with adjustment knob 522C which is operably connected to second arm 520B such that knob 522C may be operated to loosen second arm 520B and adjust its position in slot 522B.

Figure 6A:
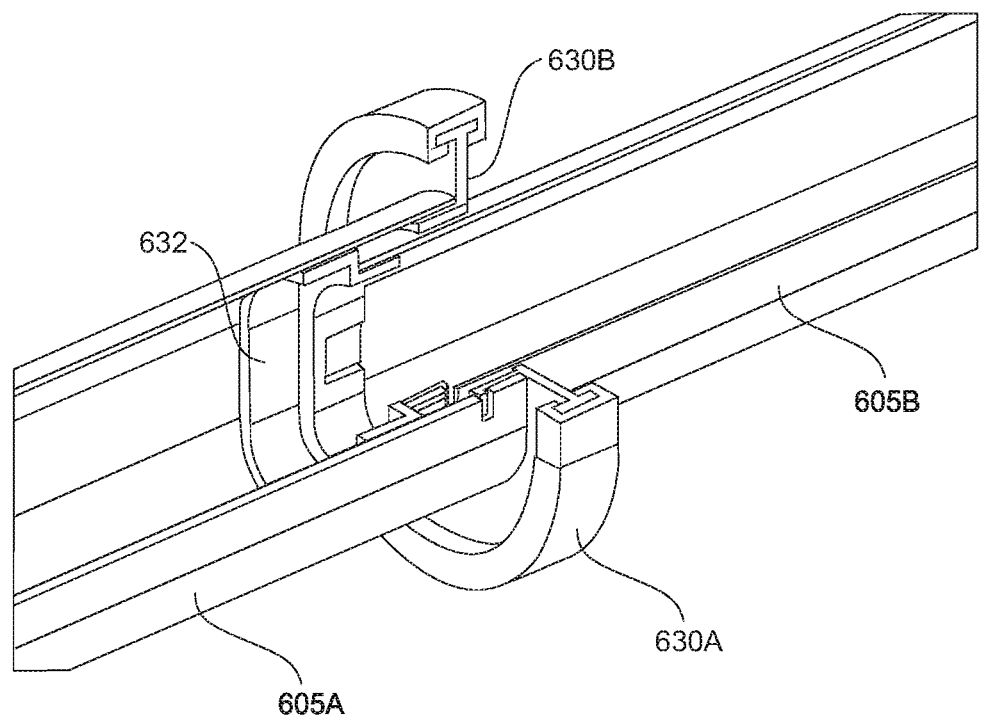
FIG. 6A depicts an exemplary spacer implemented in a vehicle protection device.
Figure 6B:
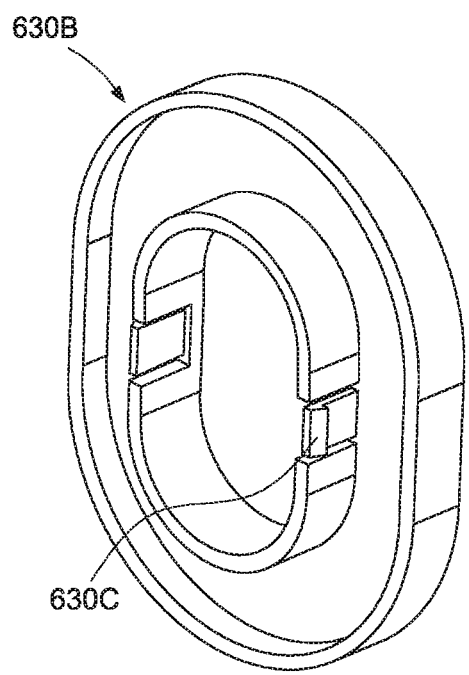
FIG. 6B depicts an exemplary spacer component.

FIG. 6A depicts an exemplary spacer implemented in a vehicle protection device. FIG. 6B depicts an exemplary spacer component. The spacer, or separator, includes a spacer base 630B. The base 630b is provided with an aperture and lip configured such that an inner telescoping extension 605B passes through the aperture of base 630B and thence inside outer telescoping extension 605A. The lip on the aperture of base 630B fits inside an end of outer telescoping extension 605A. The end of the inner telescoping extension is provided with an end fitting 632 which fits within outer telescoping extension 605A. Accordingly, the inner telescoping extension may advantageously slide within the outer telescoping extension, and may be advantageously supported therein at least at two points by the aperture lip of the base 630B and the end fitting 632. The base 630B may be retained inside the outer telescoping extension 605A by the two retaining elements 630C. The retaining elements may be, for example, snap hooks, as depicted, or other appropriate retaining structures. The outer telescoping extension may be provided with a plurality of slots configured to receive the snap hooks.

The base 630B is provided with an outer lip. A covering 630A fits over the outer lip and is thereby retained thereon. In some embodiments, the covering may be integrally molded, may be fastened on, or may be adhesed on. The covering 630A may be shock absorbing and may be, for example, shock absorbent rubber cushion rings which may serve as impact absorbers to prevent transmission of impacts to the vehicle to which the VPD is attached.

Figure 7:
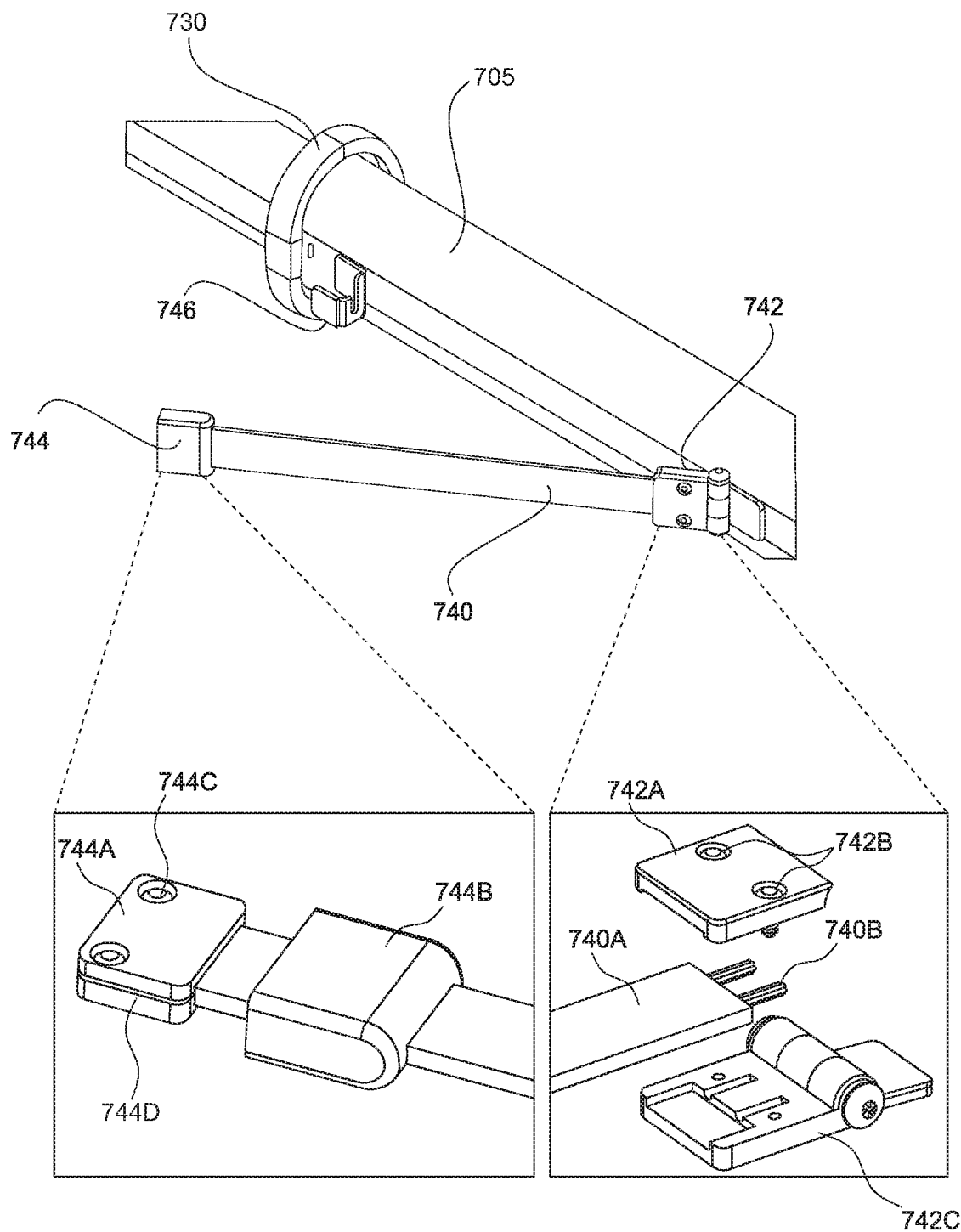
FIG. 7 depicts an exemplary security strap.

FIG. 7 depicts an exemplary security strap. The strap 740 is rotatably attached to the housing 705 at one end by connector 742. Strap 740 may be releasably coupled against the housing 705 by disposing end 744 inside of holster 746. One end of the security strap may be released from the housing 705 by removing end 744 from holster 746 and rotating the sleeve away from the housing. The end 744 may then be shut, for example, into a vehicle door, thereby advantageously securing the VPD to the vehicle.

The security strap 740 is constructed of two cables 740B encased in sleeve 740A. The security strap may be flexible or semi-rigid. The sleeve is cut back, as shown, to fit in matching cavities in end clamp pieces 742A, 742C, 744A, and 744D. Mating end clamp pieces 742A and 742C are clamped together over exposed ends of cables 740B and the ends of sleeve 740A using fasteners 742B. Similarly mating end clamp pieces 744A and 744D of end 744 are clamped together over the other end of security strap 740 using fasteners 744C. Fasteners 744C and 742B may be, for example, screws, tamper proof screws, bolts, or other appropriate fasteners. In various embodiments, the mating clamp pieces may, for example, be glued, welded, heat welded, or overmolded as unitary pieces. The end clamp pieces of end 744 are covered with a sheath 744B which may be, for example, rubber, urethane, plastic, metal. The sheath may be flexible, semi-rigid, or rigid and may, for example, simply fit into place, snap into place, adhese into place, or fasten into place. Mating piece 742C of connector 742 includes a hinge. In some embodiments, the hinge may be a rolled hinge, as shown, or may be, for example, a living hinge. In some embodiments, the hinge may be omitted and the security strap be simply fastened to the housing 705. In such embodiments, the security strap may be sufficiently flexible to obviate the need for a hinge.

Figure 8A:
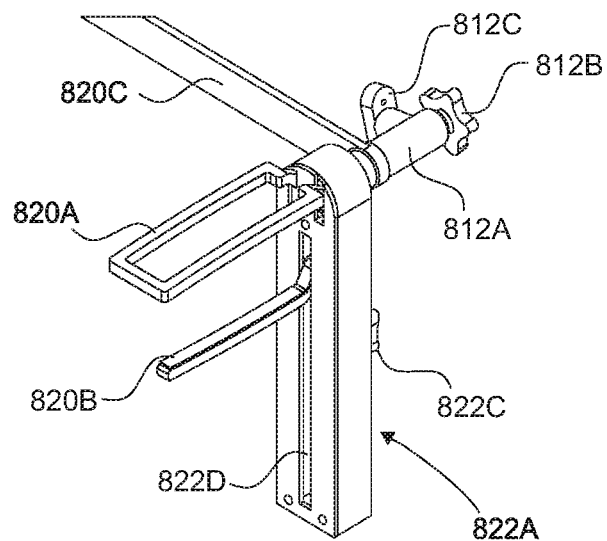
FIG. 8A depicts an exemplary clip for a vehicle protection device.
Figure 8B:
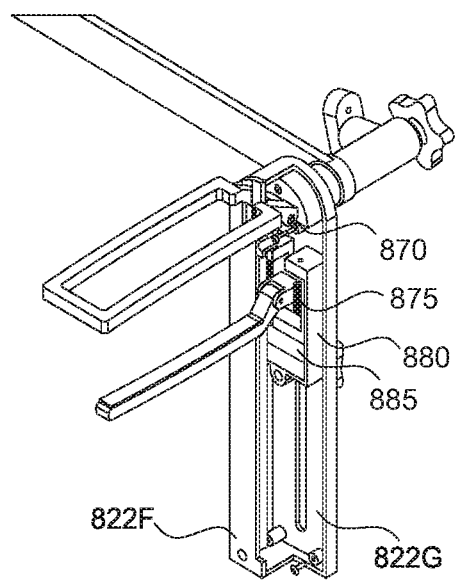
FIG. 8B depicts a section view of the exemplary clip of FIG. 8A.

FIG. 8A depicts an exemplary clip for a vehicle protection device. FIG. 8B depicts a section view of the exemplary clip of FIG. 8A. Clip body 822A is a two-piece housing, having a back 822G and a removable cover 822F. The back 822G is provided with a slot 822B. Second arm 820B is pivotably connected to inner sleeve 880. Inner sleeve 880 is disposed within outer sleeve 885. Knob 822C passes through slot 822B and engages outer sleeve 885. When operated in one direction (e.g., counterclockwise), knob 822C may loosen the sleeve, allowing the second arm to be repositioned along the slot 822B. When operated in another direction (e.g., clockwise), knob 822C may tighten the outer sleeve 885 against the back 822G, thereby clamping the second arm 820B in position.

The inner sleeve 880 is constrained to a predetermined range of motion within the outer sleeve 885. Extension springs 875 are connected between the outer sleeve 885 and the inner sleeve 880 such that the inner sleeve 885 is urged upwards, thereby enhancing clamping force of the second arm 820B when, for example, the clip is positioned over a tire and wheel rim. Ribs may, for example, be provided on the interior of cover 822F to prevent disengagement of the springs. The first arm 820A and second arm 820B may be adjusted, for example, to releasably couple the clip to a tire and wheel rim. The first arm 820A is an upper arm with a wider profile, and may advantageously grip an outer radius of the tire while the second arm 820B is a lower arm with a thinner profile and may advantageously slide between spokes or an aperture in the wheel. The clip may be advantageously expanded or compressed based on a tire profile to tightly grip both the tire and the wheel, with extension springs 875 urging the lower arm towards the upper arm which may enhance gripping of the tire and wheel when attached thereto.

The first arm 820A is rotatably connected within clip 822A by hinge pin 870. Hinge pin 870 may be a coiled spring hinge pin. A coiled spring hinge pin may be configured, for example, to provide a 'friction hinge' effect which may keep the arm deployed in the desired position. The hinge may include 'stops' to prevent the arms from rotating beyond 90 degrees from a collapsed position. Second arm 820B may be similarly configured to be rotatably connected with a coiled spring hinge pin.

The clip may be fastened, for example, to the end of a telescoping extension by coupler 812C which may be fastened or rotatably connected to body 812A. Knob 812B operates a clamping mechanism within or through body 812A to allow clip body 822A to rotate relative to housing 812A, or to clamp it still in relation thereto. Extension arm 820C is rotatably connected to housing 812A and is also clamped or released to rotate by operation of knob 812B. In some embodiments, knob 812B may be omitted and the clip body 822A connected to housing 812A by a friction hinge. In some such embodiments, the only knob may be knob 822C used in repositioning of the second arm relative to the clip body 822A.

Although various embodiments have been described with reference to the figures, other embodiments are possible. For example, in some embodiments a ball and cable may be used as security mechanism. The ball may be attached to a braided steel or similar cable encased in a cut resistant sleeve, the cable being also attached to the VPD, and the cable retracts using any of, but not limited to, a recoil mechanism or hand pull system. To install the security cable, the user may press a "Release Button", pull the cable to desired length, place the ball inside the vehicle and shut the door against the cable, thereby locking the ball inside the vehicle and capturing it between the door and the pillar of the vehicle. Once locked, if the VPD is equipped with a recoil tensioner mechanism, the recoil mechanism may tightly secure the cable. If the VPD is equipped with a hand puller, such as a hand pull-and-hook mechanism, the user may pull the handle to tighten and then wrap the excess cable in a cable securing mechanism (e.g., opposing hooks, which may be configured as a 'cleat' such as is used to secure a boat to a dock) underneath a center housing of the VPD. Some embodiments may be provided with a release button used to release the cable for adjustment, and a hook mechanism to hold excess cable after adjustment. Some embodiments provided with a recoil tensioner may not include a hand pull mechanism. In various embodiments, a trip wire for an alarm system may be threaded through a cut resistant sleeve of the security cable.

During attachment of the VPD to a vehicle, the release button may be pressed to release the cable, the ball may then placed into the vehicle and the door firmly shut against the cable, locking and wedging the ball inside the vehicle, in-between the doors and the side pillars. Then, using the pull handle, the cable is pulled to tighten and firmly secure the ball inside the vehicle, and any excess cable is wrapped around the hooks to secure it. If equipped with the recoil tensioner, the cable is pulled out or extended, the ball is tossed into the vehicle, the door is slightly shut against the cable, the release button is pressed to recoil the ball, wedging it in-between the vehicle doors and side pillars the door is pushed to shut firmly.

In some embodiments, a security strap may be provided having a plurality of cut resistant cords encased in a cut resistant cover. The security strap may have a terminus at one end of the strap. The terminus may be a two-part clamp which clamps a free end of the security strap, and being covered with a sheath. The strap may be attached to the housing, for example, by a hinged mechanism. The cut resistant cords may be, for example, thin, braided steel cable wire, or similar wire. The cut resistant cover may, for example, be composed of nylon, aramides (e.g., poly-para-phenylene terephthalamide), high molecular polyethylene (HMPE). The cut resistant cover may be made, for example, of braided fibers. The sheath may be made of a compliant material (e.g., rubber, silicone, polyethylene, or other elastic, shock-absorbing, or flexible material). A compliant sheath may advantageously protect the vehicle from damage by the terminus. The terminus may be attached to the housing by being placed in a holster, by being retracted by a recoil tensioner mechanism, or by engaging with a pull-handle. The holster may, for example be welded to the extension. The terminus may be secured to housing by slightly twisting the strap and sliding the terminus into the holster. The two-part clamp and the hinge mechanism may, for example be constructed from aluminum (e.g., 6061). The aluminum may, for example be anodized.

In some embodiments, the security strap may be provided with a theft preventive alarm system. The alarm system may be water resistant, may be battery powered, may be activated when at least some portion of the security strap is cut, or some combination thereof. The terminus may include an electronic unit with a continuous trip wire running through the cut resistant cover and looping back to the electronic unit in a continuous path. The hinged mechanism may, for example, be provided with a speaker that emits an alarm signal when the alarm system is activated (e.g., by a discontinuity, such as by cutting, in the trip wire).

Some embodiments may include a cushioning bumper on a surface of the center piece of the VPD typically oriented towards a vehicle body. This bumper helps minimize damages to the attached vehicle, should there be an impact. The cushion may include patterned designs to help dissipate impact. Cushioning linings may be added to the edges of the device to prevent, for example, tips of telescoping extensions from bending or debris from entering the telescoping extensions or housing. In various embodiments, various components of a VPD such as clips, fender clamps, security ball, security cable, security strap, or some combination thereof, may be provided with cushioned (e.g., 'rubberized') coatings. Such coatings may advantageously provide friction against smooth surfaces, prevent damage to the body of the vehicle, and provide some cushion for impact.

In some embodiments, a VPD may be provided with a theft deterring trip wire alarm system that is activated when a burglar attempts to cut a security cable. The alarm may include a trip wire that runs through the security cable sleeve, and activates an alarm when the trip wire is cut. In some embodiments, the alarm system may be a water resistant, battery powered theft deterring device featuring a loud alarm system which may be activated during a theft attempt (e.g., damaging or cutting the trip wire, which may be concealed in the security cable). When tripped, the alarm system may issue an alarm signal, for example, for a predetermined length of time.

In various embodiments, the telescoping extensions, housing, or some combination thereof, may be made with, by way of example and not limitation, anodized aluminum, fiberglass or carbon fiber telescopic poles. In some embodiments, plastics may be used in various aspects of the VPD, such as the clip mechanism, the arms of the clip, the release button located in the center of the housing, and components the clamp. In some embodiments, at least some portion of the VPD, for example, a clip body or cover, may be made from polyoxymethylene (POM) plastic. In some embodiments, extension arms are made from aluminum (e.g., 6061 or 7075 aluminum), and may be overmolded in a compliant material (e.g., rubber or a similar flexible or elastic material). In some embodiments, the arms of the clip may be constructed from aluminum (e.g., 6061 or 7075 aluminum), and may be overmolded with rubber or a similar compliant material.

In various embodiments, the VPD may include two clips, one for a front tire of a vehicle and one for a rear tire. The VPD may also include two fender clamps, and may be configured with only fender clamps. The VPD may be provided as a kit with two VPDs, for example, having one VPD for each side of a vehicle. Such a kit may include four clips to attach the two VPDs to all four tires and wheels of the vehicle.

In various embodiments, the clip may be the primary form of attachment for the device. A given clip may attach to all four wheels and tires of the vehicle. The clip may adjust vertically to fit the tire profile of the vehicle and rotate horizontally to accommodate different points of attachment on a wheel and tire of the vehicle. When attached, the clip may be connected to coupling spacers that suspend the telescoping sections in the air, away from the vehicle. The clip may rest on the tire and thereby help cushion impacts by transmitting most of the force from an impact to the tires. The clip may include spring assisted arms. The function of the spring mechanism may be to constantly pull the arms to the closing or folding position, thereby creating stronger grip when attached. To attach, the arms may be pulled apart and the clip adjusted to the desired position, then the clip may inserted into the tire and wheel and the arms released. To detach, the lower arm may be pulled down, and the clip expanded and removed from the tire and wheel.

In some embodiments having a clip provided with a knob for adjusting the position of the lower arm and a knob for adjusting the orientation of the clip body. In some such embodiments, the lower arm may be spring-loaded. Various strengths of springs may be used and may, for example, be selected or adjusted in a range of strengths. In some such embodiments, springs may be selected from five predetermined sets of extension springs providing clamping forces between three (3) pounds-force (lbf) and sixteen and one-half (16.5) lbf. In some embodiments with an adjustable lower arm, at least one slot in the clip body may be provided. In some embodiments, the clip body may be provided with a series of apertures for a mechanism attached to the lower arm to be passed through which may be used to advantageously adjust the position of the lower arm. In some embodiments, the distance between the first arm and second arm of a clip, when in an extended state, may be adjusted, for example, between three (3) inches and ten (10) inches. In various embodiments, the second arm of a clip may be configured to be adjusted along the length of the clip body, while preserving a range of motion along the clip body. For example, after clamping the second arm in place, the springs may allow the second arm to move after clamping in place within a linear range, for example, of one (1) inch.

In various embodiments, a fender clamp may be a supplemental form of attachment housed by a spacer between a clip and telescoping extensions. The fender clamp may provide a mode of attachment for vehicle that may not have an opening in the wheels or have overly large or small tire side profile that does not fit within the clip's range of motion. The clamp may be 'rubberized', and advantageously attach the VPD to the vehicle by coupling, for example, to the quarter panels, fender flares, or wheel rim spokes of a vehicle. In various embodiments, the clip may adjust vertically and rotate horizontally. Similarly, the fender clamp may be configured to be attached through various means, including by way of example and not limitation, a captive screw, a push release or a regular scissor clamp.

Various embodiments may be provided with at least two spacing couplers located at the end of the telescoping extensions. The spacing couplers may connect the clip at each end to the respective last telescoping extension on each end. The spacing couplers may advantageously be configured to suspend the telescoping extensions in the air, away from an attached vehicle, creating a buffer space between the attached vehicle and the telescoping extensions. For example, the spacing couplers may be in the form of an "L," and the length of the L perpendicular to the telescoping arms may be predetermined or adjustable to adjust the buffer space between the VPD and the vehicle.

This buffer space may serve as a sort of "personal bubble" around the attached vehicle. Therefore, objects heading towards the side of the attached vehicle may impact and be stopped by the telescoping extensions. The buffer space and spacing couplers may prevent the poles from making contact with the attached vehicle. In case a more severe impact occurs, causing the VPD to make impact with the body of the vehicle, the VPD may be provided with a plurality of shock absorbing separators (such as 'rubberized' discs) that absorb the shock. Similarly, the central housing of the VPD may be provided with a shock absorbing bumper on a surface oriented towards the vehicle. During a more severe impact, the bumper may absorb impact to the vehicle to prevent or reduce damages to the attached vehicle. In some embodiments, spacers at the end of may be configured to house or be coupled to fender clamps.

In various embodiments, the VPD may be provided with fold-out extension arms. The fold-out extension arms may be provided on each end of the VPD, and may be configured to rotate at least 180 degrees, such that they may be oriented to provide additional protection, for example, to the front and rear quarter panels of the vehicle. The extension arms may be coated with a shock absorbing material (e.g., a 'rubberized' material), and may be located in between the clip and the telescopic extensions and rotatably connected to a spacing coupler. The fold-out extension arms may be advantageously adjusted to protect a region of an attached vehicle that is not protected by the actual telescoping extension and cushioning separators. It extends all the way to or close to the front and rear bumpers of the vehicle. The coupling spacer and fold-out extension arms may be provided with stoppers that prevent the arms from rotating past 180 degrees. The stoppers may advantageously help to ensure that when a user quickly 'flips' the extension arms in or out, they will line up horizontally with the rest of the VPD when folded (e.g., in a collapsed state of the VPD) or unfolded (e.g., in an extended state of the VPD).

The fold out extension arms may be extended if a user desires to have additional protection on the front and rear quarter panels of the vehicle. Similar to the telescopic poles (telescoping extensions), they may serve as barriers that prevent any object from hitting the attached vehicle. The arms may be advantageously suspended in the air when extended, and may be coated in a shock-absorbing coating (e.g., 'rubber,' urethane, foam, silicone, or neoprene) to help cushion impacts and prevent damages should a strong impact occur, causing it to touch the body of the attached vehicle. After use, the arms may be folded back into a closing position, which may be in-between the clip and the telescopic poles. The device may then be retracted.

In some embodiments, the telescoping extensions may be all arranged on a single end of the housing. A clip, for example, may be connected to the housing, and a clip attached to a final telescoping extension. The VPD may be, for example, attached to one tire and wheel rim by a first clip, and the telescoping extensions extended and the second clip attached to a second tire and wheel rim.

In various embodiments, a gripping handle or portion may be provided at one or both ends of the VPD. The VPD may be constructed of a thermally insulative material, or may be provided with a thermally insulative coating. A user may advantageously manipulate the VPD using the gripping handle(s), for example, to extend or retract the device. A thermally insulative gripping portion may be particularly advantageous in hot or cold weather to prevent discomfort or thermal injury due to extreme temperatures of the VPD when it is exposed to the environment.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A vehicle protection device comprising:
an elongate telescoping barrier comprising a housing having at least one telescoping extension slidably extendable therefrom;
a first coupler and a second coupler connected at opposite ends of the telescoping barrier;
a first coupling module connected to the first coupler and a second coupling module connected to the second coupler, each of the coupling modules being rotatable relative to the telescoping barrier and being configured to releasably couple the vehicle protection device to a vehicle;
a plurality of separators disposed on the telescoping barrier; and
a release mechanism operable to transition the telescoping barrier between a collapsed state and an extended state;
wherein:
the coupling modules are configured to releasably couple the vehicle protection device to a vehicle, and
each coupling module is configured to be rotated substantially parallel to the telescoping barrier when in a collapsed state, and
the at least one telescoping extension is configured to slidably collapse at least partially into the housing when in a collapsed state.

2. The vehicle protection device of claim 1, wherein the first coupling module is a first clip, the second coupling module is a second clip, and each clip comprises:
a clip body;
a first arm in pivoting connection with the clip body; and
a second arm in pivoting connection with the clip body; and
wherein when the vehicle protection device is transitioned to a collapsed state the first arm and second arm of each clip are configured to pivot against and substantially parallel to the respective clip body.

3. The vehicle protection device of claim 1, wherein:
the at least one telescoping extension comprises two telescoping extension sets, a first telescoping extension set extending from a first end of the housing, and a second telescoping extension set extending from a second end of the housing;
each telescoping extension set comprises at least one telescoping extension; and
the first coupler is connected a distal end of the first telescoping extension set, and the second coupler is connected to a distal end of the second telescoping extension set.

4. The vehicle protection device of claim 2, wherein:
the first clip is configured to be secured to a first tire and corresponding first wheel rim of the vehicle by positioning the first arm of the first clip over a top of the first tire and inserting the second arm of the first clip through an aperture in the first rim,
the second clip is configured to be similarly secured to a second tire and corresponding second wheel rim a same side of the vehicle as the first tire and wheel rim, and
the vehicle protection device is configured to be thereby suspended along the side of the vehicle such that the vehicle protection device is positioned to absorb impacts including opening of a door of a parallel vehicle thereagainst.

5. The vehicle protection device of claim 1, further comprising at least one extension arm in rotatable connection with at least one of: the first coupler and the second coupler;
wherein the at least one extension arm is configured to be rotated parallel to and extending from an end of the telescoping barrier.

6. The vehicle protection device of claim 5, further comprising a knob connected to each extension arm and operable to repositionably clamp the extension arm in an orientation relative to the plurality of telescoping extensions.

7. The vehicle protection device of claim 1, further comprising at least one security extension connected to the housing, the security extension comprising a security terminus at one end;
wherein the security terminus is configured to be releasably coupled to a vehicle such that the housing is releasably coupled to the vehicle by the security extension.

8. The vehicle protection device of claim 7, wherein:
the security extension comprises a cut-resistant cable, and the security terminus comprises a teardrop-shaped wedge configured to be trapped between a door and a corresponding pillar of a door frame of the vehicle to which the vehicle protection device is thereby releasably coupled.

9. The vehicle protection device of claim 7, further comprising:
a connector rotatably connecting the housing and an end of the security extension opposite of the security terminus; and
a holster disposed on the housing and configured to receive the security terminus;
wherein the security extension comprises a strap comprising a plurality of cut-resistant cords covered by a jacket.

10. The vehicle protection device of claim 1, wherein at least one coupling module comprises at least one fender clamp connected to at least one of: the first coupler and the second coupler, the at least one fender clamp comprising:
a first clamping member and second clamping member; and
an urging mechanism operably connected to at least one of: the first clamping member and the second clamping member;
wherein the urging mechanism is configured to urge the first clamping member and second clamping member together such that a portion of a vehicle may be clamped therebetween.

11. The vehicle protection device of claim 2, wherein:
one of the plurality of separators are provided at each of at least one junction in the telescoping barrier;
each junction comprises an inner telescoping member which is configured to slide at least partially inside an outer telescoping member;
the inner telescoping member is coupled to an end fitting configured to slide inside the outer telescoping member;
the outer telescoping member is provided with at least one slot in a wall thereof; and
each separator comprises:
an aperture configured to fit over the inner telescoping member,
a lip extending from the aperture and configured to fit inside an end of the outer telescoping member, and comprising at least one snap hook configured to engage the at least one slot, and
a covering configured to cover an outside of the separator.

12. The vehicle protection device of claim 4, wherein:
the second arm operates as a lower arm,
the clip body comprises a back and a removable cover configured to be removably attached to the back,
the removable cover is provided with a first slot extending lengthwise along the removable cover, through which the lower arm protrudes,
the back is provided with a second slot extending lengthwise along the back and parallel to the first slot,
a knob is connected to the lower arm through the second slot and is operable to repositionably secure the lower arm relative to the clip body such that the knob may move along the second slot and the lower arm may correspondingly move along the first slot.

13. The vehicle protection device of claim 12, further comprising:
an outer sleeve disposed in the clip body between the back and the removable cover;
an inner sleeve disposed within the outer sleeve, and movable within the outer sleeve within a predetermined range of motion parallel to the first slot;
at least one spring coupling the inner sleeve to the outer sleeve and configured to urge the inner sleeve towards the first arm;
wherein:
the lower arm is pivotably connected to the inner sleeve, and
the knob is connected to the outer sleeve, and operable to repositionably clamp the outer sleeve to the clip body, thereby repositionably securing the lower arm within the clip body within the predetermined range of motion between the inner sleeve and the outer sleeve.

14. The vehicle protection device of claim 2, further comprising a knob connected to the clip and operable to repositionably clamp the clip body in an orientation relative to the plurality of telescoping extensions.

15. The vehicle protection device of claim 7, further comprising a theft deterrent system, the theft deterrent system comprising:
at least one trip wire at least partially disposed in the security extension, and
a speaker;
wherein the theft deterrent system is configured to emit an alarm signal from the speaker when the at least one trip wire is severed.

16. A method for protecting a vehicle comprising:
providing a vehicle protection device in a collapsed state, the vehicle protection device comprising:
an elongate telescoping barrier comprising a housing having at least one telescoping extension slidably extendable therefrom;
a first coupler and a second coupler connected at opposite ends of the telescoping barrier;
a first coupling module connected to the first coupler and a second coupling module connected to the second coupler, each of the coupling modules being rotatable relative to the telescoping barrier and being configured to releasably couple the vehicle protection device to a vehicle;
a plurality of separators disposed on the telescoping barrier; and
a release mechanism operable to transition the telescoping barrier between a collapsed state and an extended state;
transitioning the vehicle protection device to an extended state by:
operating the release mechanism and at least partially slidably extending the telescoping barrier, and
rotating the first coupling module and the second coupling module relative to the telescoping barrier; and
releasably coupling the first coupling module to a first portion of the vehicle and the second coupling module to a second portion of the vehicle.

17. The method of claim 16, wherein:

the first coupling module is a first clip, the second coupling module is a second clip, and each clip comprises:
a clip body;
a first arm in pivoting connection with the clip body; and
a second arm in pivoting connection with the clip body;
the method further comprises the step of pivoting the first arm and second arm of each clip to extend away from the clip body;
releasably coupling the first coupling module to a first portion of the vehicle comprises clamping a first tire and wheel rim of a vehicle between the first arm and second arm of the first clip, thereby releasably coupling the first clip thereto; and
releasably coupling the second module to a second portion of the vehicle comprises clamping a second tire and wheel rim of a vehicle between the first arm and second arm of the second clip, thereby releasably coupling the first clip thereto, the second tire and wheel rim being on a same side of the vehicle as the first tire and wheel rim.

18. A vehicle protection device comprising:
an elongate telescoping barrier comprising a housing having at least one telescoping extension slidably extendable therefrom,
means for releasably coupling the telescoping barrier to a side of a vehicle in at least two locations such that the telescoping barrier is spaced away from the side of the vehicle;
a plurality of separators disposed on the telescoping barrier; and
means for transitioning the vehicle protection device from a collapsed state to an extended state.

19. The vehicle protection device of claim 18, further comprising:
means for releasably coupling the telescoping barrier to an inaccessible portion of the vehicle.

20. The vehicle protection device of claim 18, wherein the means for releasably coupling the telescoping barrier to a side of a vehicle in at least two locations comprises a means for releasably coupling the telescoping barrier to two tires and corresponding wheel rims.

* * * * *